Aug. 20, 1946.  R. P. PEDERSEN  2,406,162
LAWN MOWER SHARPENER
Filed June 6, 1945    2 Sheets-Sheet 2

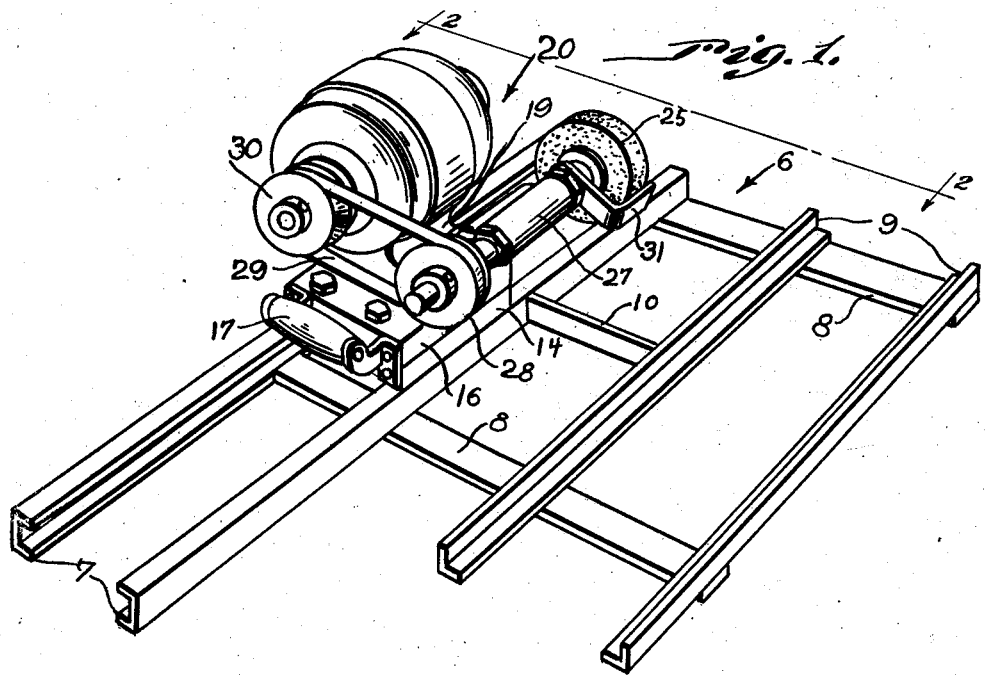
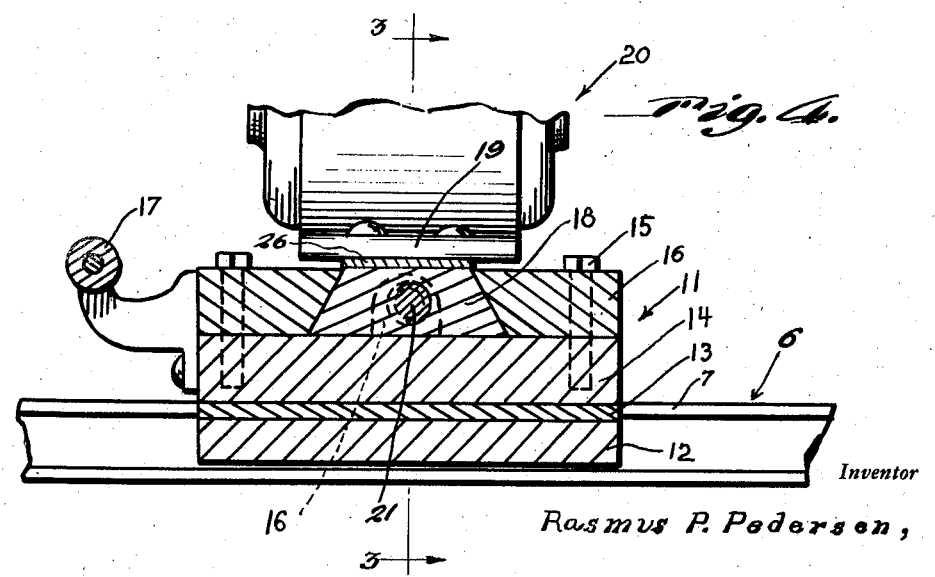

Inventor
Rasmus P. Pedersen,

By *Clarence A. O'Brien
and Harvey B. Jacobson*
Attorneys

Patented Aug. 20, 1946

2,406,162

UNITED STATES PATENT OFFICE 2,406,162

LAWN MOWER SHARPENER

Rasmus P. Pedersen, Cody, Wyo.

Application June 6, 1945, Serial No. 597,784

3 Claims. (Cl. 51—34)

This invention relates to a structurally distinct, novel and functionally improved lawn mower sharpener.

Briefly, the preferred embodiment of the invention is characterized by an open work frame, this constituting a base adapted for placement on a stationary supporting surface and constructed to permit the conventional lawn mower to be temporarily racked and seated therein, the same also including a track arrangement, the latter having a carriage mounted for traveling therein, and said carriage serving as a support for an electric motor-driven abrasive wheel.

Novelty is predicated upon a simple and expedient framework having on one side a pair of parallel channel irons forming the carriage track means, and having angle irons arranged in a parallel pair on the other side, these serving as convenient chairs, so called, for seating the wheeled frame of the conventional lawn mower while it is being worked upon.

Another object of the invention is the provision of a simple and expedient carriage assembly, this serving as the shiftable mount for the motor and other parts, the same having a hand-grip for shifting the entire assembly back and forth in the tracks, and also having adjusting means for the abrasive and motor means to regulate the position of the abrasive wheel in respect to the cutter blades on the mower reel.

Other features and advantages will become more readily apparent from the following description and the accompanying illustrative drawings.

In the drawings, wherein like numerals are employed to designate like parts throughout the views:

Figure 1 is a perspective view of a lawnmower sharpener constructed in accordance with the principles of this invention, the lawnmower being omitted to more satisfactorily and clearly illustrate the main parts.

Figure 2 is a detail sectional and elevational view showing the lawn mower perched on the frame with the sharpener lined up for ready use, this as seen from the point represented by the line 2—2 of Figure 1.

Figure 3 is a fragmentary section taken approximately on the plane of the line 3—3 of Figure 4, looking into the direction of the arrows.

Figure 4 is a view at right angles to Figure 3, the same being taken on the plane of the line 4—4 of Figure 3, this also looking in the direction of the arrows.

The framework forming the base is generally denoted by the numeral 6 and is brought out to advantage in Figure 1. It is characterized by a pair of parallel longitudinal channel-irons 7 which coact in forming a trackway. The irons themselves may be referred to as tracks. They are connected together by cross-ties 8 so arranged as to project and adequately support the relatively shorter angle irons 9. These irons 9, as before stated, serve to function as seats or chairs for the conventional lawn mower A. The numeral 10 designates a cross-cleat located in such a position as to serve as a rest for the usual roller B on the lawnmower (see Fig. 2). Incidentally, as the lawn mower is a standard type, it is not necessary to describe it in detail other than to mention the customary frame structure, the roller B, the reel C and the blades D which go to make up said reel. The angle irons 9 are sufficiently far apart as to effectively poise and suspend the lawn mower wheels therein. Thus, the lawn mower is seated and held relatively stationary while the sharpener means, as a unit, is shifted back and forth in the tracks 7.

Attention is directed at this time to the reciprocatory carriage or so-called mount. This is generally denoted by the numeral 11 (see Figs. 3 and 4). This part is of laminated form, the lower lamination or plate being indicated at 12, and this fitting nicely between and in the tracks to slide back and forth. Then, on top of this is a thinner stabilizing plate 13 which rides between the upper flanges of the channel irons or tracks. Attached to the plate 13 is an intermediate lamination or plate 14 which rides atop the top flanges of the tracks. Then, bolted on this, as at 15, is a so-called top plate 16. The plates 14 and 16 have bracket means attached to one side and the bracket means is provided with a hand-grip 17 of the roller type. The plate 16 is centrally slotted and the walls of the slots are undercut to form a guideway and to accommodate a dovetailed slide 18 carrying the base 19 which supports the electric motor 20. Slide 18 serves as a key and works back and forth in the guideway in which it is mounted, and a feed screw 21 (see Fig. 3) is operatively connected thereto. The feed screw is provided at its outer end with a hand crank 22 journaled in a bearing provided in a suitable bracket 23 fastened, as at 24, to the block or plate 14. This arrangement permits the motor to be adjusted in relation to the mount or carriage to regulate the position of the abrasive or emery wheel 25. It will be noted in this connection, and in reference to Figure 1, that the base 19 (see Figs. 3 and 4) is provided with an underlying metal strap 26 which terminates in an upstanding bearing 27, the bearing serving to receive the shaft on which the grinding wheel 25 is keyed for rotation. The opposite end of the shaft is provided with a pulley 28 over which a belt 29 is trained, the belt being further trained over a companion pulley 30 on the electric motor shaft. The numeral 31 designates an L-shaped finger which constitutes a guide and gauge element. This is fastened in place by the nut means shown and serves as a sort of a shoe for reception of the blades D, as brought out in Figure 2.

As stated, the finger 31 acts as a guide or rest for the blades of the mower, holding them at the same angle on the face of the grinding wheel 25 as it moves from one end of the blades to the other. It is locked in position by means of a lock nut and can be adjusted so as to give the edges of the blades D any angle desired.

The amount of depth or cut can be accurately regulated by means of the crank in the carriage on which the motor is mounted and which regulates and holds the slide or key 18 in the desired position. The right hand is placed on the handle 17 just below the driving belt (see Fig. 1), and the left hand on the top blade, exerting just enough pressure to hold the blade being ground down to the guide 31, while with the right, as the grinder operates, move the unit along the tracks the length of the blade.

The adjustment of the grinding wheel should not be changed until all blades have been ground to the first setting, which should be a very light cut. Then repeat the operation until a sharp edge appears on the full length of all blades. Never grind one blade without also grinding all the rest to the same setting. After all blades have been sharpened, remove the cutter bar and sharpen to a straight edge, giving it an edge similar to that on a pair of scissors. Properly adjusted, the mower will then cut a piece of paper by simply spinning the cutter wheel and inserting it.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. In a lawn mower sharpener of the class described, a base having track means, a pair of spaced parallel angle irons, said angle irons constituting seating chairs for the usual wheels on a standard type lawn mower, a carriage slidable in said track means, said carriage being provided with a hand grip to assist in shifting it to and fro in relation to the lawn mower reel, an electric motor on said carriage, a bearing carried by said carriage, a shaft mounted for rotation in said bearing, a pulley on said shaft, said motor being provided with a pulley, a belt trained over said pulleys, and an abrasive wheel on said shaft, and an L-shaped depth gauge and blade guide mounted on said shaft adjacent the abrasive wheel.

2. A lawn mower sharpener structure of the class described comprising a unitary open-type framework forming a base, the latter embodying a pair of duplicate spaced parallel channel irons constituting guide tracks, cross-ties connected to and interconnecting the lower portions of said channel irons and extending laterally to one side of said irons and in parallelism to each other, a pair of spaced parallel angle irons connected to the outer ends of said cross-ties, said angle irons being in spaced parallelism in relation to said channel irons and of lengths corresponding to each other but less than the lengths of said channel irons, and an upstanding cleat mounted between the inner channel and inner angle irons and constituting a lawn mower roller rest.

3. A lawn mower sharpener structure of the class described comprising a unitary open-type framework forming a base, the latter embodying a pair of duplicate spaced parallel channel irons constituting guide tracks, cross-ties connected to and interconnecting the lower portions of said channel irons and extending laterally to one side of said irons and in parallelism to each other, a pair of spaced parallel angle irons connected to the outer ends of said cross-ties, said angle irons being in spaced parallelism in relation to said channel irons and of lengths corresponding to each other but less than the lengths of said channel irons, and an upstanding cleat mounted between the inner channel and inner angle iron and constituting a lawn mower roller rest, said angle irons constituting seating chairs for the usual wheels on a standard type lawn mower, a carriage slidable in said track means, said carriage being provided with a hand grip to assist in shifting it to and fro in relation to the lawn mower reel.

RASMUS P. PEDERSEN.